(12) United States Patent
Griffin et al.

(10) Patent No.: US 9,063,344 B1
(45) Date of Patent: Jun. 23, 2015

(54) METHOD AND APPARATUS FOR DEBLURRING AN IMAGE

(75) Inventors: Steven Griffin, Kihei, HI (US); Brandoch Calef, Kihei, HI (US); David R. Gerwe, West Hills, CA (US)

(73) Assignee: THE BOEING COMPANY, Chicago, IL (US)

(*) Notice: Subject to any disclaimer, the term of this patent is extended or adjusted under 35 U.S.C. 154(b) by 296 days.

(21) Appl. No.: 13/425,747

(22) Filed: Mar. 21, 2012

(51) Int. Cl.
*G06K 9/40* (2006.01)
*G02B 27/40* (2006.01)

(52) U.S. Cl.
CPC ........................................ *G02B 27/40* (2013.01)

(58) Field of Classification Search
None
See application file for complete search history.

(56) References Cited

U.S. PATENT DOCUMENTS

| | | | | |
|---|---|---|---|---|
| 4,930,868 | A * | 6/1990 | Gerlitz | 359/15 |
| 6,359,681 | B1 * | 3/2002 | Housand et al. | 356/4.01 |
| 7,227,111 | B2 | 6/2007 | Eckelkamp-Baker et al. | |
| 7,440,634 | B2 | 10/2008 | Ben-Ezra et al. | |
| 7,756,407 | B2 | 7/2010 | Raskar | |
| 2005/0161578 | A1 * | 7/2005 | Eckelkamp-Baker et al. | 250/201.1 |
| 2006/0119710 | A1 * | 6/2006 | Ben-Ezra et al. | 348/208.99 |
| 2009/0284644 | A1 * | 11/2009 | McKaughan et al. | 348/348 |
| 2012/0105655 | A1 * | 5/2012 | Ishii et al. | 348/208.4 |

OTHER PUBLICATIONS

Christou et al., "Isoplanicity Measurements for Calibration of Speckle Holography Amplitudes", Optics Communications, vol. 58 No. 1, May 1986, pp. 4-10.
Puetter et al., "Digital Image Reconstruction: Deblurring and Denoising", Annual Review Astronomy and Astrophysics, vol. 43 No. 1, Aug. 2005, pp. 139-194.
Joshi et al., "Image Deblurring using Inertial Measurement Sensors", ACM Transactions on Graphics (TOG)—Proceedings of ACM SIGGRAPH 2010, vol. 29 No. 4, Jul. 2010, pp. 1-8.

* cited by examiner

*Primary Examiner* — Bhavesh Mehta
*Assistant Examiner* — Andrew Moyer
(74) *Attorney, Agent, or Firm* — Yee & Associates, P.C.

(57) ABSTRACT

A method and apparatus for reducing blur in an image generated by an imaging system is provided. A blur model for the image is identified with respect to an exposure time for the image using a sequence of reference images of an artificial reference point object generated during the exposure time for the image. A source of the artificial reference point object is inertially stabilized over the exposure time. The image is deconvolved with the blur model identified for the image to form a modified image having a desired reduction in blur relative to the image generated by the imaging system.

24 Claims, 6 Drawing Sheets

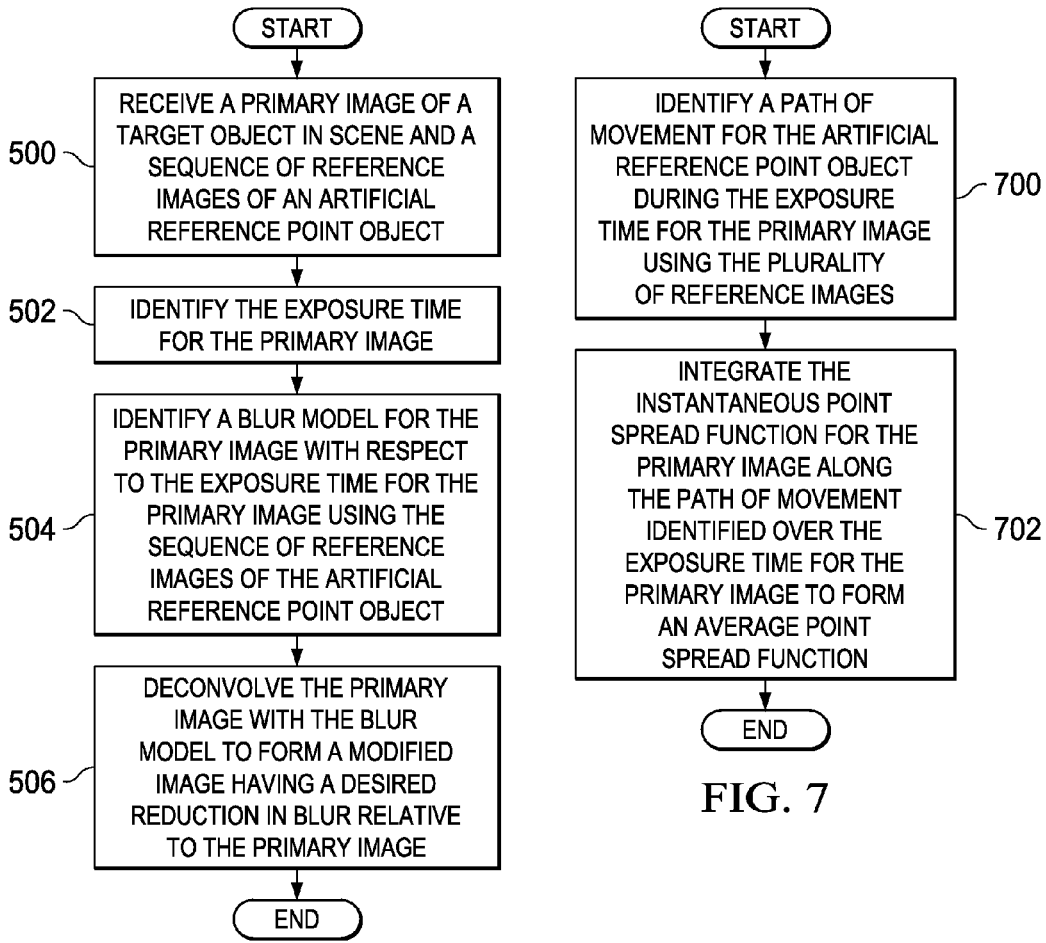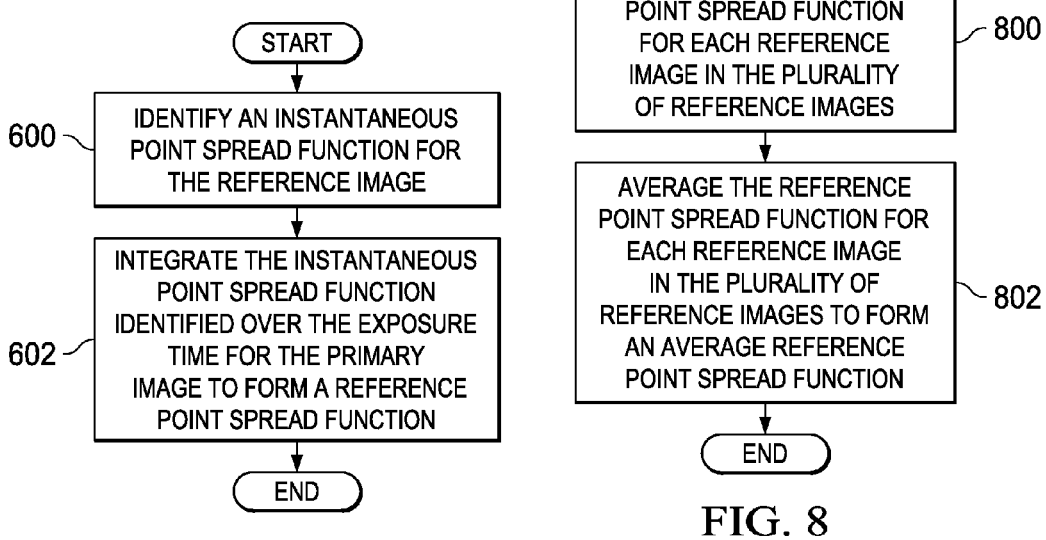

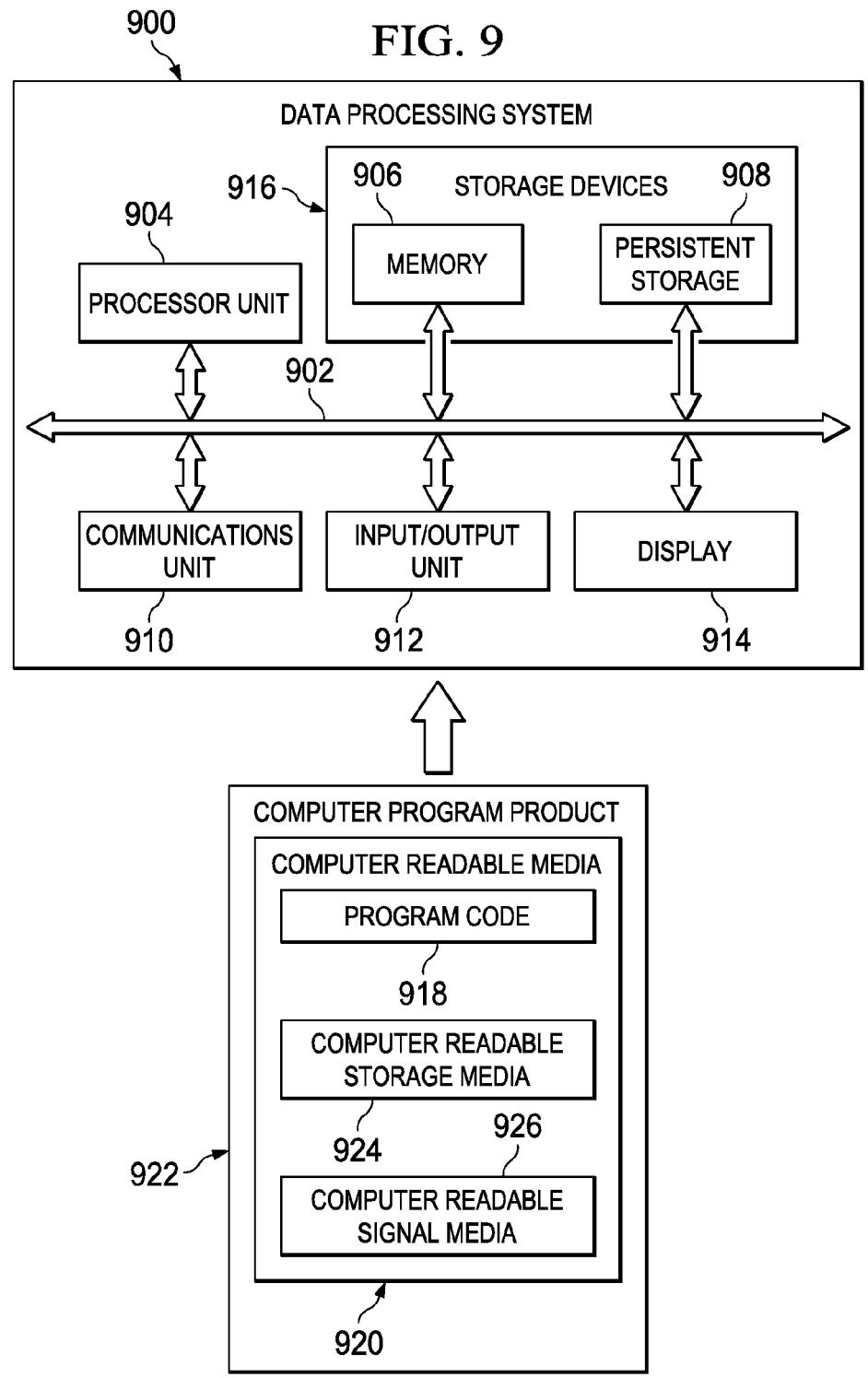

METHOD AND APPARATUS FOR DEBLURRING AN IMAGE

GOVERNMENT LICENSE RIGHTS

This application was made with United States Government support under contract number FA9451-05-C-0257 awarded by the Department of Defense. The United States Government has certain rights in this application.

BACKGROUND INFORMATION

1. Field:

The present disclosure relates generally to image processing and, in particular, to reducing blur in an image. Still more particularly, the present disclosure relates to a method and apparatus for reducing the blur in an image using an artificial reference point object generated by an inertially stabilized source.

2. Background:

In some situations, images of a scene generated by an imaging system may be blurred. For example, objects in the scene may appear blurred in the images. At least a portion of the blurring of objects in an image may occur in response to relative movement between the imaging system and the scene. This type of blur may be referred to as motion blur. Currently, a number of techniques is available for reducing the blur and, in particular, the motion blur, in an image or a sequence of images. Reducing the blur in an image may be referred to as "deblurring" the image.

Currently available deblurring techniques are typically grouped into two categories, pre-processing techniques and post-processing techniques. Pre-processing techniques are implemented before an image has been generated. Pre-processing techniques typically comprise hardware-based methods, which may increase the cost for deblurring images more than desired.

Post-processing techniques are implemented after an image has been generated. Some post-processing techniques use deconvolution algorithms to reduce the blur in an image. These deconvolution algorithms rely on a point spread function (PSF) for the image to reduce the blur in the image.

The point spread function for an image is the response of the imaging system that generated the image to a point object. In other words, the point spread function estimates the amount of blur for a point object in an image. The point spread function may be independent of a position of the point object within a field of view of the imaging system. In some cases, with high resolution narrow field of view imaging systems, the point spread function may have a high degree of accuracy independent of the position of the point object within the field of view or over a particular region of the image.

The image generated by an imaging system may be considered a convolution of a "pristine image" and the point spread function for the image. As used herein, a "pristine image" is the image without any blur. Currently available deconvolution algorithms use a point spread function identified for the image based on optical properties of the imaging system that generated the image. These deconvolution algorithms deconvolve the image generated by the imaging system with this point spread function to obtain a modified image with reduced blur relative to the image generated by the imaging system.

However, in some cases, the point spread function identified for an imaging system may not estimate the amount of blur for a point object in an image generated by the imaging system with a desired level of accuracy. For example, the point spread function may not take into account motion blur caused by movement of the objects relative to the imaging system or movement of the imaging system relative to the scene captured in the image. In some cases, the spatial structure of the motion blur may vary randomly in time in an unpredictable manner.

Consequently, deconvolving an image generated by the imaging system with this type of point spread function may not produce an image with the desired reduction in blur. Therefore, it would be desirable to have a method and apparatus that takes into account at least some of the issues discussed above as well as possibly other issues.

SUMMARY

In one illustrative embodiment, a method for reducing blur in an image generated by an imaging system is provided. A blur model for the image is identified with respect to an exposure time for the image using a sequence of reference images of an artificial reference point object generated during the exposure time for the image. A source of the artificial reference point object is inertially stabilized over the exposure time. The image is deconvolved with the blur model identified for the image to form a modified image having a desired reduction in blur relative to the image generated by the imaging system.

In another illustrative embodiment, an apparatus comprises an imaging system, a source, and an image processing system. The imaging system is configured to generate an image in which the image is formed over an exposure time. The source is configured to generate an artificial reference point object during the exposure time for the image. The source is inertially stabilized over the exposure time for the image. The image processing system is configured to identify a blur model for the image with respect to the exposure time for the image using a sequence of reference images of the artificial reference point object and deconvolve the image with the blur model to form a modified image having a desired reduction in blur relative to the image generated by the imaging system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 5 is an illustration of a process for reducing blur in an image in the form of a flowchart in accordance with an illustrative embodiment;

FIG. 6 is an illustration of a process for identifying a blur model for an image using a reference image in the form of a flowchart in accordance with an illustrative embodiment;

FIG. 7 is an illustration of a process for identifying a blur model using a plurality of reference images in the form of a flowchart in accordance with an illustrative embodiment;

FIG. 8 is an illustration of a process for identifying a blur model using a plurality of reference images in the form of a flowchart in accordance with an illustrative embodiment; and FIG. 9 is an illustration of a data processing system in accordance with an illustrative embodiment.

DETAILED DESCRIPTION

The different illustrative embodiments recognize and take into account different considerations. For example, the different illustrative embodiments recognize and take into account that some currently available post-processing techniques may use one or more stars in a scene as natural reference point objects for improving images of the scene and reducing motion blur in these images.

However, the different illustrative embodiments recognize and take into account that a star may not always be present in a scene being captured by an imaging system. Further, in some cases, a star that is present in a scene may not be visible in the scene being captured by an imaging system or in the images generated by the imaging system. For example, stars may not be useful for reducing motion blur in images taken indoors and/or during the daytime. The different illustrative embodiments recognize and take into account that a technique for deblurring an image that uses an artificial reference point object may be desirable.

Further, the different illustrative embodiments recognize and take into account that some currently available deconvolution algorithms may be capable of reducing the blur in an image to obtain a desired image if the deconvolution algorithms use a model that estimates the amount of blur, including the motion blur, in an image with a desired level of accuracy. The different illustrative embodiments recognize and take into account that an artificial reference point object may be used to generate a model that estimates the amount of blur in an image with a desired level of accuracy.

Additionally, the different illustrative embodiments recognize and take into account that some currently available imaging systems use inertial reference units to compensate for relative movement between these imaging systems and a scene. However, these currently available imaging systems may require that the inertial reference units inertially stabilize the imaging systems over the total period of time during which some number of sequential images of the scene are being generated. The size, weight, and/or cost of the inertial reference units needed to inertially stabilize the imaging systems over this total period of time may be more than desired. Thus, the different illustrative embodiments provide a method and apparatus for deblurring images using an artificial reference point object.

Figure 1:
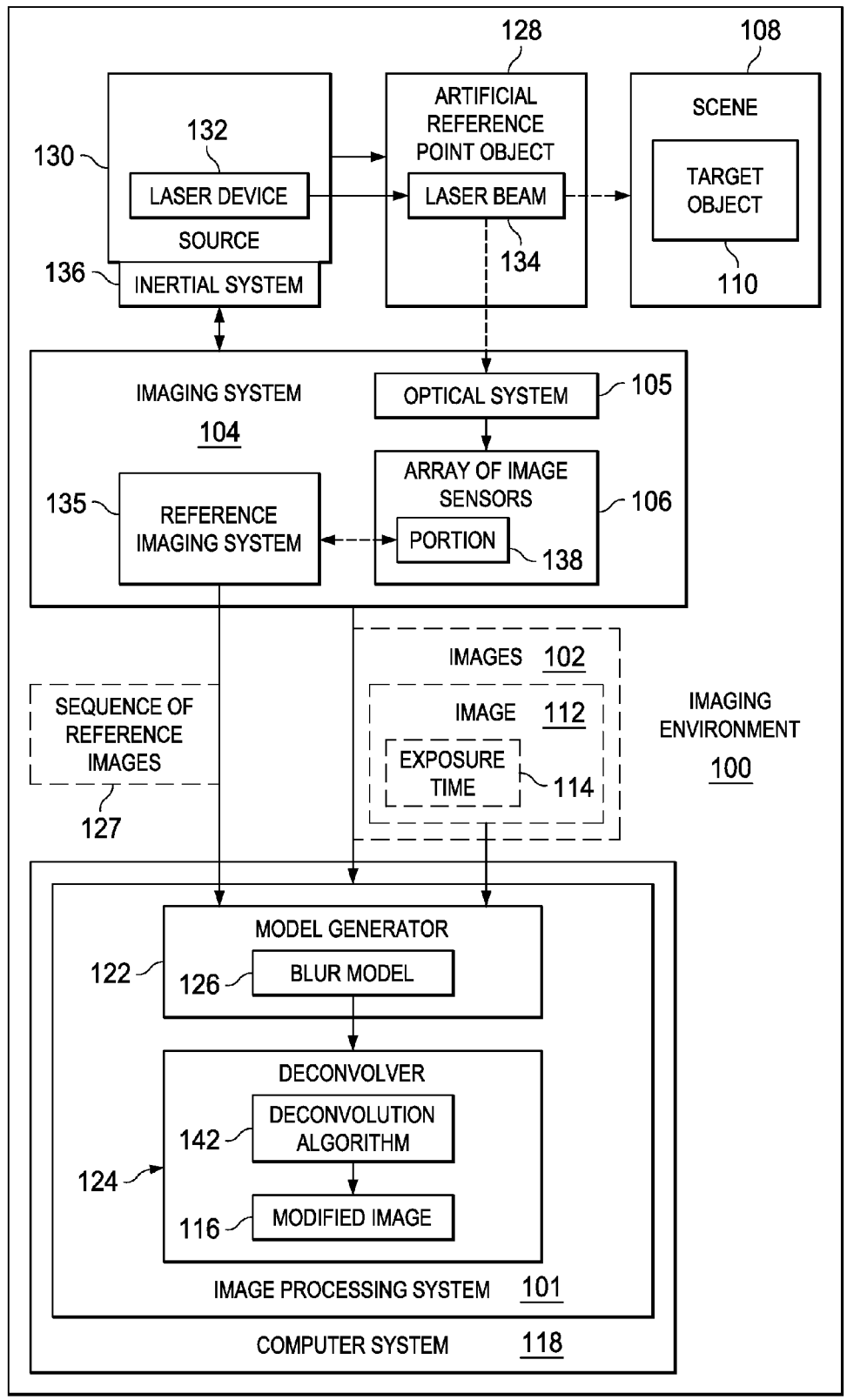
FIG. 1 is an illustration of an imaging environment in the form of a block diagram in accordance with an illustrative embodiment.

Referring now to the figures and, in particular, with reference to FIG. 1, an illustration of an imaging environment in the form of a block diagram is depicted in accordance with an illustrative embodiment. In these illustrative examples, imaging environment 100 is an environment in which image processing system 101 is configured to process images 102 generated by imaging system 104.

Imaging system 104 is any type of system configured to form images 102 in response to detecting light. The light detected may comprise visible light, infrared (IR) light, near-infrared (NIR) light, ultraviolet (UV) light, and/or other types of light. Imaging system 104 may take the form of, for example, without limitation, a camera system, an infrared imaging system, a laser imaging system, a video camera system, a combination of one or more of the above, or some other suitable type of imaging system.

In one illustrative example, imaging system 104 comprises optical system 105 and array of image sensors 106. Optical system 105 is configured to focus light onto array of image sensors 106. Optical system 105 may comprise any number of lenses, mirrors, prisms, optical telescopes, and/or other suitable devices configured to focus light onto array of image sensors 106.

Each image sensor in array of image sensors 106 is configured to detect light and convert this light into an electrical signal. The electrical signals generated by array of image sensors 106 may be used to form images 102. Each image sensor in array of image sensors 106 may be selected from one of, for example, without limitation, an active pixel sensor (APS), a charge-coupled device (CCD) image sensor, a complementary metal-oxide-semiconductor (CMOS) image sensor, or some other suitable type of image sensor. Depending on the implementation, array of image sensors 106 may be referred to as a focal plane array (FPA), an orthogonal transfer array (OTA), or some other type of array of image sensors.

In these illustrative examples, imaging system 104 is configured to generate images 102 of scene 108. In some illustrative examples, images 102 may form a video of scene 108. Images 102 generated by imaging system 104 may also be referred to as "frames".

Scene 108 may be any area of interest. Scene 108 may be, for example, an indoor scene, an outdoor scene, a neighborhood, a city, an area in a forest, an area in a manufacturing facility, a part in an inspection system, a specimen in a microscope or medical imaging device, a region of Earth observed from an aerial platform or space-based platform, a collection of objects in the air or in space, or some other suitable type of scene. As depicted, a number of target objects is present in scene 108. As used herein, a "number of", when referred to items, means one or more items. In this manner, a number of target objects means one or more target objects.

Target object 110 is an example of a target object present in scene 108. Target object 110 may take various forms. For example, target object 110 may be a person, a vehicle, an aircraft, an unmanned aerial vehicle, a missile, an animal, a building, a man-made structure, a tree, a cloud, a bush, a road, a river, a stream, a background feature, or some other suitable type of object of interest.

Image processing system 101 is configured to receive and process images 102 generated by imaging system 104. In these illustrative examples, one or more of images 102 received at image processing system 101 from imaging system 104 are blurred images. As used herein, a "blurred image" is an image in which at least a portion of the image appears unclear, indistinct, hazy, or blurred in some other manner.

Image 112 is an example of one of images 102 of scene 108 that is blurred. In particular, image 112 is an image of target object 110. Target object 110 appears blurred in image 112. The blurring of target object 110 in image 112 may be caused by a number of different factors that include both static factors and dynamic factors.

Static factors that contribute to the blur in image 112 may include, for example, without limitation, diffraction associated with the collection aperture of imaging system 104, inconsistencies in a focal plane array of imaging system 104, wavefront aberrations from inconsistencies in the optical design and/or optical components, and/or other factors. Inconsistencies in the optical system may be due to, for example, without limitation, misalignment of one or more optical devices in optical system 105 of imaging system 104, tilting of one or more optical devices in optical system 105 of imaging system 104, surface deformations on one or more optical devices in optical system 105 of imaging system 104, undesired performance of one or more image sensors within imaging system 104, and/or other factors. Further, index of refraction variations in the media between the imaging system and the object may contribute to the blur in image 112. Atmospheric turbulence may be one example of these types of variations.

Dynamic factors that contribute to the blur in image 112 may include any relative movement between imaging system 104 and scene 108 during exposure time 114 for image 112. As used herein, the "exposure time" for an image, such as exposure time 114 for image 112, is the period of time during which array of image sensors 106 in imaging system 104 is exposed to light to form image 112.

Relative movement between imaging system 104 and scene 108 may include movement of imaging system 104 relative to scene 108 and/or movement of target object 110 relative to imaging system 104. For example, when imaging system 104 moves relative to target object 110 in scene 108 during exposure time 114 for image 112, the portion of image 112 representing target object 110 is an integration of all positions for target object 110 relative to imaging system 104 during exposure time 114. Consequently, target object 110 appears blurred in image 112.

Further, imaging system 104 may move relative to scene 108 during exposure time 114 when imaging system 104 pans, zooms, and/or tilts during exposure time 114. In some cases, imaging system 104 may vibrate, shake, or move in some other manner that results in relative movement between imaging system 104 and scene 108.

Additionally, elements within optical system 105 may vibrate or move relative to each other resulting in deflections of the optical beam sent to array of image sensors 106. This type of movement may cause motion of the image formed on array of image sensors 106. In some illustrative examples, undesired or unintended movement of imaging system 104 relative to scene 108 may be referred to as "jitter". The blur in image 112 caused by these different types of dynamic factors may be referred to as "motion blur".

Image processing system 101 is configured to process images 102 to reduce the blur in images 102. For example, image processing system 101 processes image 112 to form modified image 116 having a desired reduction in blur relative to image 112. In some illustrative examples, modified image 116 may be a near-diffraction-limited image. A "near-diffraction-limited image", as used herein, is an image formed with a resolution near the theoretical limit for the image based on imaging system 104 within selected tolerances.

Image processing system 101 may comprise hardware, software, or a combination of the two. In one illustrative example, image processing system 101 is implemented in computer system 118. Computer system 118 comprises a number of computers. When more than one computer is present in computer system 118, these computers may be in communication with each other.

As depicted, image processing system 101 comprises model generator 122 and deconvolver 124. Model generator 122 is configured to identify a blur model for each image in images 102 with respect to an exposure time for that image. For example, model generator 122 identifies blur model 126 for image 112 with respect to exposure time 114 for image 112.

Blur model 126 estimates the amount of blurring for a point object in image 112 based on exposure time 114 for image 112. As used herein, a "point object" is a source of light having substantially negligible dimensions with respect to the resolution power of imaging system 104. In other words, the geometry of a point object may be approximated as a mathematical point having zero dimensions. In some cases, the point object may be referred to as being infinitesimal.

Model generator 122 may identify exposure time 114 for image 112 using, for example, without limitation, metadata corresponding to image 112. Of course, in other illustrative examples, model generator 122 may identify exposure time 114 for image 112 in some other suitable manner.

In these illustrative examples, model generator 122 forms blur model 126 for image 112 using sequence of reference images 127. Sequence of reference images 127 may include one or more reference images. When more than one reference image is present in sequence of reference images 127, these reference images are ordered with respect to time.

Each of sequence of reference images 127 is an image of artificial reference point object 128. Artificial reference point object 128 is a point object that is formed using artificial means. In other words, artificial reference point object 128 does not exist naturally. A natural point object, on the other hand, may be, for example, a star, a planet, an asteroid, or some other type of astronomical body.

Further, in these illustrative examples, artificial reference point object 128 may not be a point object that is already present in scene 108. For example, a small light source, such as a small incandescent bulb, a fluorescent bulb, or a light emitting diode (LED) already present within scene 108, when viewed from sufficient distance is unresolved by imaging system 104, may not be considered artificial reference point object 128. Artificial reference point object 128 may be referred to as a "pseudo-star" in some cases.

In these illustrative examples, source 130 generates artificial reference point object 128 during the entire exposure time for image 112. Source 130 is inertially stabilized over exposure time 114 such that artificial reference point object 128 is inertially stabilized over exposure time 114.

As used herein, a component being "inertially stabilized" over an exposure time means that the component is substantially motionless during the exposure time. In other words, movement of the component during the exposure time may be considered negligible compared to the resolving power of the imaging system. In these illustrative examples, source 130 is inertially stabilized over exposure time 114 for image 112 within selected tolerances.

Inertial system 136 is configured to inertially stabilize source 130. Inertial system 136 may comprise an inertial reference unit (IRU), an inertial measurement unit (IMU), a number of gyroscopes, a number of accelerometers, a microelectromechanical system (MEMS), a number of inertial sensors, a number of gimbals, a number of weights, a number of grommets, a number of springs, a number of dampers, and/or other suitable components configured to inertially stabilize source 130 over exposure time 114.

In one illustrative example, inertial system 136 may be a passive isolation system. In some illustrative examples, a passive isolation system may use a number of springs, a number of dampers, or a combination of the two to isolate source 130 from imaging system 104. For example, the passive isolation system may isolate source 130 from vibrations of imaging system 104. A passive isolation system may be different from an active isolation system configured to isolate source 130 from imaging system 104 using, for example, motors and/or actuators in addition to other components.

As depicted, inertial system 136 is associated with laser device 132. Further, laser device 132 may be associated with imaging system 104 in these illustrative examples. When one component is "associated" with another component, this association is a physical association in these illustrative examples.

For example, a first component, such as inertial system 136, may be considered to be associated with a second component, such as laser device 132, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Source 130 generates artificial reference point object 128 such that artificial reference point object 128 is directed toward scene 108 or directed toward optical system 105 of imaging system 104. As one illustrative example, source 130 takes the form of laser device 132. Laser device 132 generates artificial reference point object 128 in the form of laser beam 134.

In one illustrative example, laser device 132 directs laser beam 134 in a selected direction toward optical system 105 of imaging system 104. Optical system 105 of imaging system 104 focuses laser beam 134 onto array of image sensors 106 such that array of image sensors 106 detects laser beam 134. In this manner, artificial reference point object 128 may appear to be present within scene 108 from a perspective of imaging system 104. In another illustrative example, laser device 132 directs laser beam 134 in a selected direction toward scene 108 such that array of image sensors 106 detects laser beam 134.

In these illustrative examples, sequence of reference images 127 of artificial reference point object 128 is generated using reference imaging system 135. Reference imaging system 135 is configured such that relative movement between reference imaging system 135 and imaging system 104 is substantially zero within selected tolerances.

Reference imaging system 135 may take various forms. In one illustrative example, reference imaging system 135 takes the form of portion 138 of array of image sensors 106 in imaging system 104. Portion 138 of array of image sensors 106 may be the portion of image sensors in array of image sensors 106 that detects light from artificial reference point object 128. In some cases, portion 138 may be a portion of image sensors in array of image sensors 106 electrically beam steered to detect light from artificial reference point object 128.

In another illustrative example, reference imaging system 135 may be a second array of image sensors in imaging system 104 configured to receive light focused by optical system 105 of imaging system 104. Relative movement between this second array of image sensors and array of image sensors 106 in imaging system 104 is substantially zero.

Sequence of reference images 127 may be generated using reference imaging system 135 in a number of different ways. Further, model generator 122 may use sequence of reference images 127 of artificial reference point object 128 in a number of different ways to identify blur model 126 for image 112 with respect to exposure time 114. Different illustrative examples of the process for generating sequence of reference images 127 using reference imaging system 135 and the process for identifying blur model 126 for image 112 using sequence of reference images 127 are described in greater detail in FIG. 2 below.

In these illustrative examples, deconvolver 124 is configured to deconvolve image 112 with blur model 126 to form modified image 116. As used herein, "deconvolving" an image, such as image 112, with a model, such as blur model 126, means removing features and/or effects in the image as modeled by the model from the image. For example, deconvolving image 112 with blur model 126 means removing the blur modeled by blur model 126 from image 112. When this blur is removed from image 112, modified image 116 is formed.

Deconvolver 124 deconvolves image 112 with blur model 126 using deconvolution algorithm 142 to form modified image 116 having the desired reduction in blur relative to image 112. In modified image 116, target object 110 may be more clearly seen as compared to target object 110 in image 112. Deconvolution algorithm 142 may comprise any number of techniques for performing deconvolution.

In these illustrative examples, forming modified image 116 with the desired reduction in blur relative to image 112 using sequence of reference images 127 of artificial reference point object 128 may only require that source 130 be inertially stabilized over exposure time 114 for image 112 instead of over the total amount of time during which a sequence of images 102 are generated. Any apparent movement of artificial reference point object 128 in sequence of reference images 127 generated during exposure time 114 may be attributed to relative movement between imaging system 104 and scene 108.

Inertial system 136 needed for inertially stabilizing source 130 over exposure time 114 for image 112 may be smaller, lighter, and/or less expensive than the inertial system that would be needed for inertially stabilizing source 130 or inertially stabilizing imaging system 104 over the total amount of time during which a sequence of images 102 are generated. For example, a passive isolation system may be used for inertial system 136 instead of an active isolation system. A passive isolation system may be smaller, lighter, and/or less expensive than an active isolation system. In this manner, the different illustrative embodiments provide a system for reducing the amount of blur in an image, such as image 112, without increasing the weight and/or cost of imaging system 104 more than desired.

Figure 2:
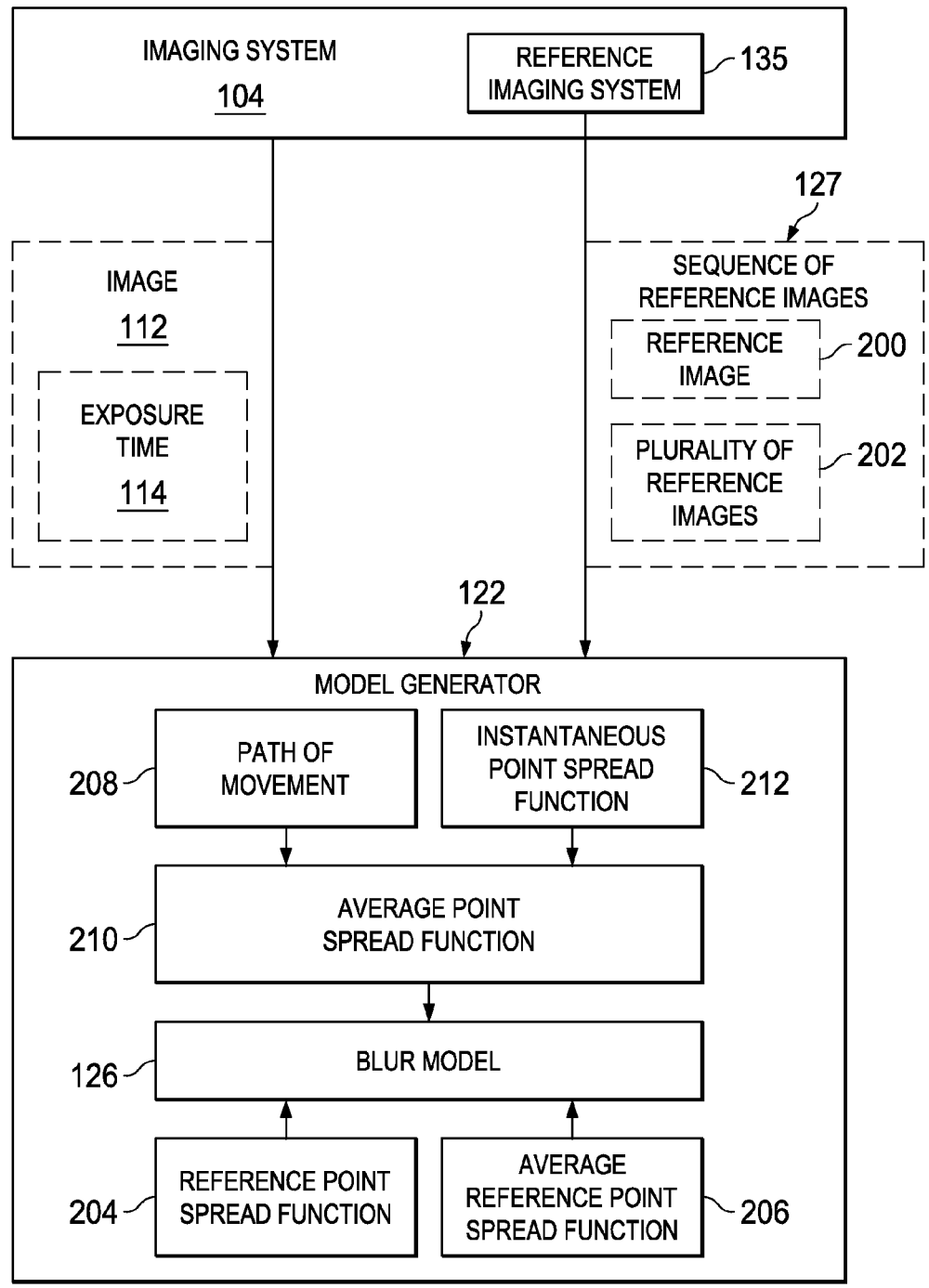
FIG. 2 is an illustration of a reference imaging system and a model generator in the form of a block diagram in accordance with an illustrative embodiment.

With reference now to FIG. 2, an illustration of a reference imaging system and a model generator in the form of a block diagram is depicted in accordance with an illustrative embodiment. In FIG. 2, reference imaging system 135 and model generator 122 from FIG. 1 are described in greater detail.

As depicted, model generator 122 receives sequence of reference images 127 of artificial reference point object 128 in FIG. 1 from reference imaging system 135. In some illustrative examples, sequence of reference images 127 generated during exposure time 114 includes only one image of artificial reference point object 128. This single image may be, for example, reference image 200. In these illustrative examples, reference image 200 has substantially the same exposure time as exposure time 114 for image 112.

Reference image 200 of artificial reference point object 128 may be a portion of image 112 or an image separate from image 112. For example, when array of image sensors 106 in FIG. 1 is an orthogonal transfer array, reference imaging system 135 may be a portion of the orthogonal transfer array designated for imaging artificial reference point object 128. In this example, reference image 200 is the portion of image 112 generated by this portion of array of image sensors 106. Model generator 122 may extract reference image 200 from image 112 when image 112 is received by model generator 122.

In some cases, reference imaging system 135 may be a second array of image sensors in imaging system 104. In these examples, reference image 200 is the image formed by this second array of image sensors. The second array of image sensors may be exposed to artificial reference point object 128 for substantially the same amount of time as exposure time 114 for image 112.

In other illustrative examples, sequence of reference images 127 of artificial reference point object 128 generated during exposure time 114 includes plurality of reference images 202. As used herein, a "plurality of" items means two or more items. For example, plurality of reference images 202 means two or more images.

When reference imaging system 135 is a second array of image sensors, reference imaging system 135 generates plurality of reference images 202 during exposure time 114 for image 112 such that the total amount of time over which plurality of reference images 202 is generated spans substantially the entire exposure time for image 112. When reference imaging system 135 is a portion of array of image sensors 106, the electrical signals generated by this portion of array of image sensors 106 may be read out at a faster rate than the rest of array of image sensors 106 to generate plurality of reference images 202 over exposure time 114 for image 112.

Model generator 122 uses sequence of reference images 127 to identify blur model 126 for image 112 with respect to exposure time 114 for image 112. When sequence of reference images 127 includes only reference image 200, model generator 122 identifies reference point spread function 204 for reference image 200.

As used herein, a "point spread function" for an image is a model estimating the amount of blurring for any point object in the image over the exposure time for the image. Reference point spread function 204 estimates the amount of blurring of artificial reference point object 128 in reference image 200 over the exposure time for reference image 200. With reference image 200 having the same exposure time as exposure time 114 for image 112, model generator 122 may use reference point spread function 204 as blur model 126 for image 112.

When sequence of reference images 127 includes plurality of reference images 202, model generator 122 may identify average reference point spread function 206 in one illustrative example. Average reference point spread function 206 is the average of the reference point spread function for each reference image in plurality of reference images 202. Model generator 122 may use average reference point spread function 206 as blur model 126 for image 112.

In another illustrative example, model generator 122 identifies path of movement 208 for artificial reference point object 128 using plurality of reference images 202. Path of movement 208 comprises the location of artificial reference point object 128 in each reference image in plurality of reference images 202.

Model generator 122 may use, for example, without limitation, centroid-based techniques and/or any number of other motion detection techniques to identify path of movement 208 for artificial reference point object 128 using plurality of reference images 202. In some cases, model generator 122 may use plurality of reference images 202 with data provided by inertial system 136 in FIG. 1 to identify path of movement 208 for artificial reference point object 128.

Model generator 122 is configured to identify average point spread function 210 using path of movement 208. Average point spread function 210 is the average of instantaneous point spread function 212 for image 112 along path of movement 208 over exposure time 114. As used herein, an "instantaneous point spread function" for an image is the point spread function for that image at a given point in time within the exposure time for the image.

Average point spread function 210 may be the integration of instantaneous point spread function 212 along path of movement 208 over exposure time 114. Model generator 122 may use average point spread function 210 as blur model 126 for image 112.

The illustrations of imaging environment 100 in FIG. 1 and reference imaging system 135 and model generator 122 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although source 130 and inertial system 136 in FIG. 1 have been described as being separate from imaging system 104, source 130 and inertial system 136 may be considered part of imaging system 104 in some cases. Further, although reference imaging system 135 is described as being part of imaging system 104 in these illustrative examples, reference imaging system 135 may be a separate imaging system associated with imaging system 104 in a manner such that relative movement between reference imaging system 135 and imaging system 104 is substantially zero.

In other illustrative examples, imaging system 104 may be configured to receive and use sequence of reference images 127 of artificial reference point object 128 to compensate for relative movement between imaging system 104 and scene 108. This compensation may be performed while image 112 is being formed during exposure time 114. Further, this type of compensation may be referred to as active compensation.

In one illustrative example, imaging system 104 may use sequence of reference images 127 formed using portion 138 of array of image sensors 106 to electronically beam steer the other portion of array of image sensors 106 being used to form image 112. Portion 138 of array of image sensors 106 may be electronically beam steered during exposure time 114 for image 112 such that the light from scene 108 that is focused onto array of image sensors 106 appears to remain substantially still with respect to array of image sensors 106 during exposure time 114.

Figure 3:
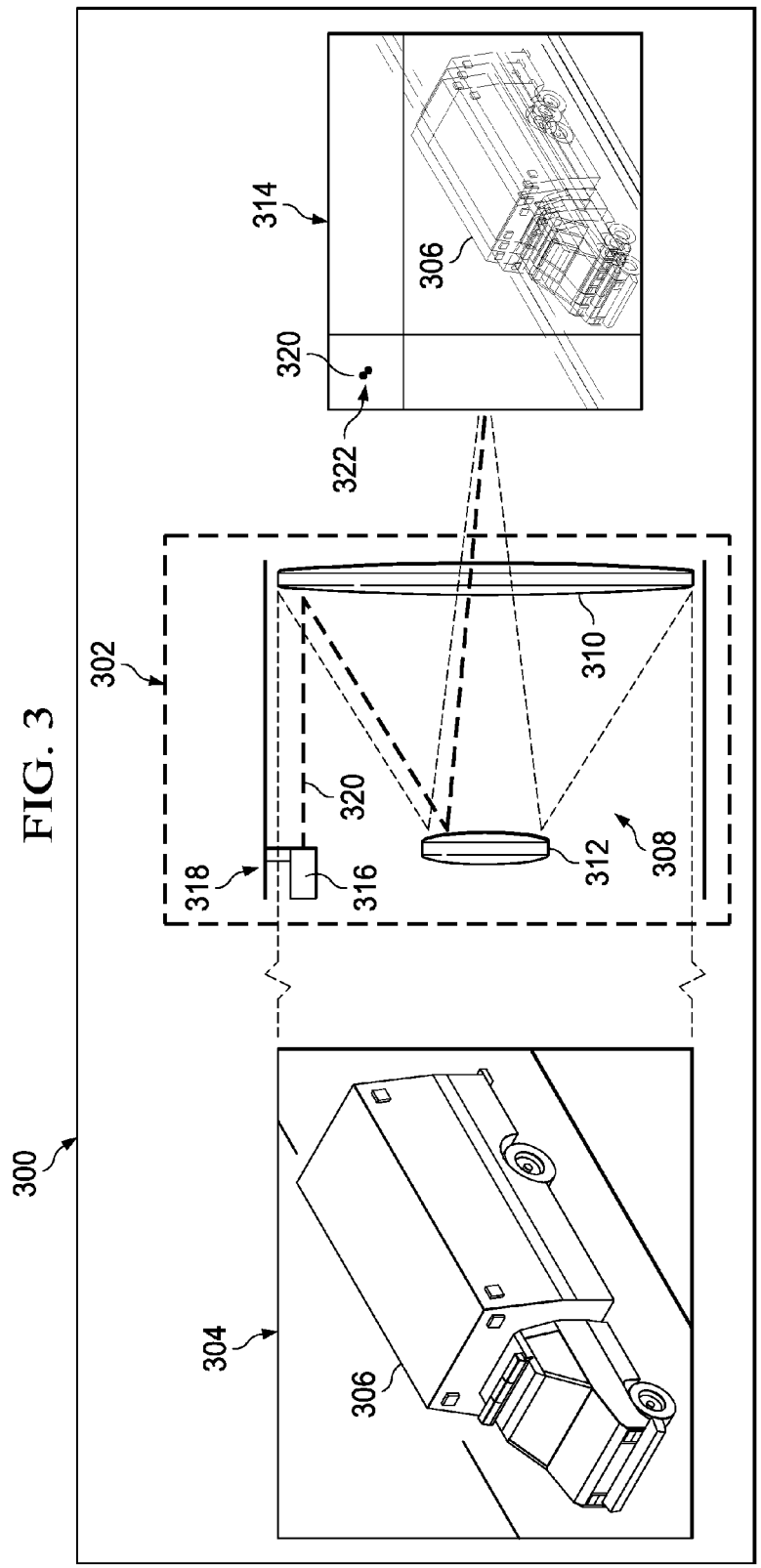
FIG. 3 is illustration of an imaging environment in accordance with an illustrative embodiment.

With reference now to FIG. 3, an illustration of an imaging environment is depicted in accordance with an illustrative embodiment. In this illustrative example, imaging environment 300 is an example of one implementation for imaging environment 100 in FIG. 1. Imaging system 302 is configured to generate images of scene 304 in imaging environment 300. As depicted, target object 306 is present in scene 304.

Imaging system 302 is an example of one implementation for imaging system 104 in FIG. 1. In this illustrative example, imaging system 302 includes optical system 308. Optical system 308 includes primary optical telescope 310 and secondary optical telescope 312. Optical system 308 is configured to focus light emanating from scene 304 onto an array of image sensors (not shown) to form image 314 of scene 304.

In this depicted example, laser device 316 is an example of one implementation for laser device 132 in FIG. 1. Laser device 316 is inertially stabilized over the exposure time for image 314 using inertial reference unit 318. Inertial reference unit 318 is an example of one implementation for inertial system 136 in FIG. 1.

As depicted, laser device 316 directs laser beam 320 toward optical system 308 such that the array of image sensors (not shown) detects laser beam 320. Laser beam 320 is an example of one implementation of artificial reference point object 128 in FIG. 1.

In this illustrative example, image 314 includes reference image 322 of laser beam 320. Reference image 322 may be used by a model generator, such as model generator 122 in FIGS. 1 and 2, to identify a blur model for image 314 with respect to the exposure time for image 314. This blur model may be used to form a modified image having a desired reduction in blur relative to image 314.

Figure 4:
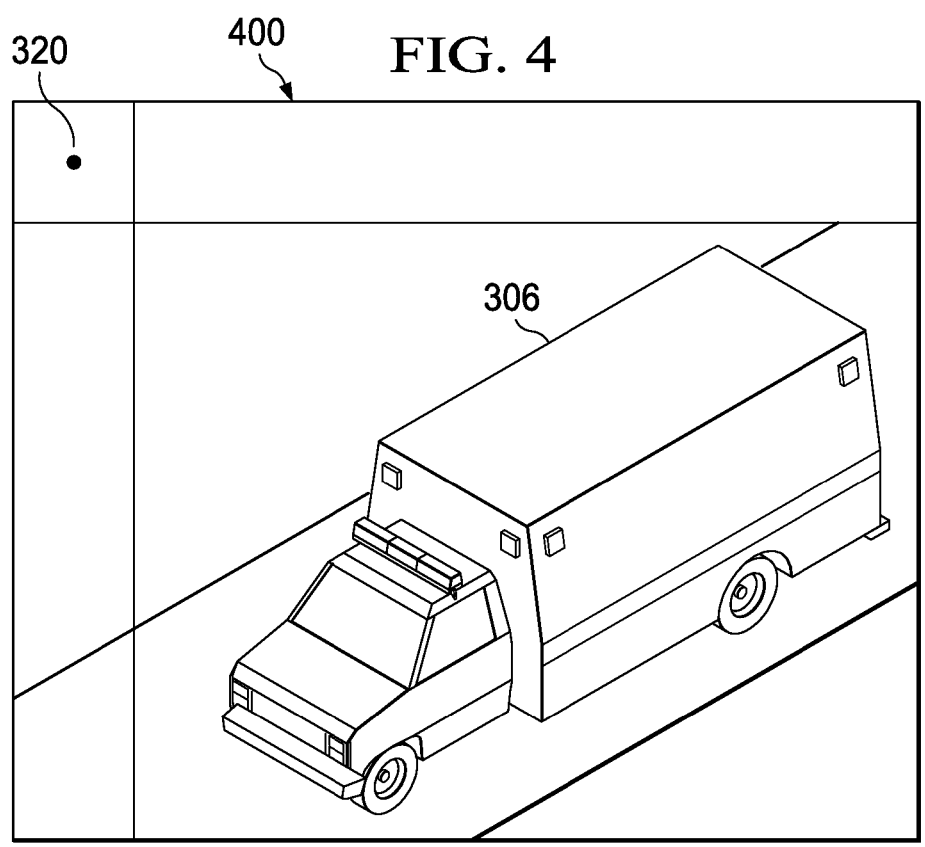
FIG. 4 is an illustration of a modified image in accordance with an illustrative embodiment.

With reference now to FIG. 4, an illustration of a modified image is depicted in accordance with an illustrative embodiment. In this illustrative example, modified image 400 is an example of one implementation for modified image 116 in FIG. 1. Modified image 400 has a reduced amount of blur relative to image 314 in FIG. 3. As depicted, target object 306 and laser beam 320 are more clearly seen in modified image 400 as compared to image 314 in FIG. 3.

Modified image 400 is formed by deconvolving image 314 in FIG. 1 with a blur model for image 314 identified using reference image 322 in FIG. 3. In particular, deconvolver 124 in FIG. 1 may be used to form modified image 400 using deconvolution algorithm 142 in FIG. 1.

With reference now to FIG. 5, an illustration of a process for reducing blur in an image in the form of a flowchart is depicted in accordance with an illustrative embodiment. The process illustrated in FIG. 5 may be implemented using image processing system 101 in FIG. 1. For example, this process may be implemented using model generator 122 and deconvolver 124 in image processing system 101 in FIG. 1.

The process begins by receiving a primary image of a target object in a scene and a sequence of reference images of an artificial reference point object (operation 500). In operation 500, the primary image may be an image generated by imaging system 104 in FIG. 1. The image may be, for example, image 112 of target object 110 in scene 108 in FIG. 1.

The sequence of reference images may be, for example, sequence of reference images 127 of artificial reference point object 128 in FIG. 1. This sequence of reference images may be generated using reference imaging system 135 in FIG. 1. The artificial reference point object captured in the sequence of reference images is generated using a source, such as source 130 in FIG. 1, which is inertially stabilized over the exposure time for the primary image.

The process then identifies the exposure time for the primary image (operation 502). In this illustrative example, when the sequence of reference images is a single reference image, such as reference image 200 in FIG. 2, the exposure time for the reference image is substantially the same as the exposure time for the primary image. When the sequence of reference images is a plurality of reference images, such as plurality of reference images 202 in FIG. 2, the total exposure time over which the plurality of reference images is generated spans substantially the entire exposure time for the primary image.

Thereafter, the process identifies a blur model for the primary image with respect to the exposure time for the primary image using the sequence of reference images of the artificial reference point object (operation 504). The process then deconvolves the primary image with the blur model to form a modified image having a desired reduction in blur relative to the primary image (operation 506), with the process terminating thereafter. Operation 506 is performed using a deconvolution algorithm.

In this illustrative example, operation 500, operation 502, and operation 504 may be performed using model generator 122 in image processing system 101 in FIG. 1. Operation 506 may be performed using deconvolver 124 in FIG. 1.

Turning now to FIG. 6, an illustration of a process for identifying a blur model for an image using a reference image in the form of a flowchart is depicted in accordance with an illustrative embodiment. The process illustrated in FIG. 6 may be used to implement operation 504 in FIG. 5 when the sequence of reference images includes only a single reference image, such as reference image 200 in FIG. 2.

The process begins by identifying an instantaneous point spread function for the reference image (operation 600). In this illustrative example, the single reference image is generated by reference imaging system 135 taking the form of a portion of array of image sensors 106 in imaging system 104 in FIG. 1. Consequently, the instantaneous point spread function for the reference image generated by reference imaging system 135 is a known instantaneous point spread function for imaging system 104.

This known instantaneous point spread function is a point spread function that may have been identified for any image generated by imaging system 104 based on factors, such as, for example, without limitation, the optical properties of optical system 105 in imaging system 104. The known instantaneous point spread function may have been identified in, for example, a testing lab. The known instantaneous point spread function does not take into account motion blur caused by relative movement between imaging system 104 and the scene captured in the primary image during the exposure time for the primary image. The known instantaneous point spread function may also be referred to as a static point spread function.

The process then integrates the instantaneous point spread function identified over the exposure time for the primary image to form a reference point spread function (operation 602), with the process terminating thereafter. The reference point spread function formed in operation 602 may be used as the blur model for the primary image.

In this illustrative example, the primary image of the target object in the scene at any given point in time during the exposure time for the primary image is referred to as an instantaneous primary image taken at the given point in time. The instantaneous primary image is defined as follows:

$$I_O(x,y,t)=\int dx' \int dy' PSF_{Cam}(x-J_x(t)-x', y-J_y(t)-y')O(x',y') \quad (1)$$

where t is the given point in time; $I_O(x,y,t)$ is the instantaneous primary image; x and y are focal-plane coordinates within imaging system 104; $PSF_{cam}$ is the known instantaneous point spread function for imaging system 104; $J_x(t)$ describes the relative movement between imaging system 104 and the scene in the x direction; $J_y(t)$ describes the relative movement between imaging system 104 and the scene in the y direction; and $O(x', y')$ is the spatial intensity distribution of the target object.

The primary image of the target object formed over the exposure time from $T_{n-1}^O$ to $T_n^O$ is defined as:

$$I_{O_n}(\overline{\theta}) = \int_{T_{n-1}^O}^{T_n^O} dt\, I(\overline{\theta}, t), \quad (2)$$

where $\overline{\theta}=(x, y)$ is the two-dimensional focal-plane position in imaging system 104.

The point spread function for the primary image over the exposure time for the primary image is the integration of the instantaneous point spread function for the primary image over the entire exposure time for the primary image. This point spread function may be referred to as a time-averaged point spread function for the primary image. The time-averaged point spread function for the primary image is defined as:

$$PSF_{AvgO,n}(\overline{\theta}) = \int_{T_{n-1}^O}^{T_n^O} dt\, PSF_{Cam}(\overline{\theta} - \overline{J}(t)), \quad (3)$$

where $$\overline{J}(t)=(J_x(t), J_y(t)) \quad (4)$$

describes the overall jitter of imaging system 104.

Further, the primary image of the target object formed over the exposure time for the primary image is defined as follows:

$$I_{O_n}(\theta)=\int d\theta' PSF_{AvgO,n}(\theta-\theta')O(\theta'). \quad (5)$$

where $I_{O_n}(\theta)$ is the primary image of the target object formed over the exposure time for the primary image. The primary image of the target object formed over the exposure time for the primary image is the convolution of the spatial intensity distribution of the target object with the point spread function of the primary image over the exposure time for the primary image.

The reference image of the artificial reference point object at a given instant within the exposure time for the reference image is referred to as the instantaneous reference image. The instantaneous reference image is defined as follows:

$$I_R(x,y,t)=\int dx'\int dy' PSF_{Ref}(x-J_x(t)-x', y-J_y(t)-y')\delta(x',y') \quad (6)$$

$$=PSF_{Ref}(x-J_x(t), y-J_y(t)) \quad (7)$$

where $I_R(x,y,t)$ is the instantaneous reference image at the given point in time, $PSF_{Ref}$ is a known instantaneous point spread function for the reference image, and $\delta(x', y')$ is a Dirac delta function representing the infinitesimal artificial reference point object.

The reference image, m, formed over the exposure time $T_{n-1}^O$ to $T_n^O$ is defined as follows:

$$I_{R_m}(\theta)=PSF_{AvgR,m}(\theta), \text{ where} \quad (8)$$

$$PSF_{AvgR,m}(\overline{\theta}) = \int_{T_{m-1}^R}^{T_m^R} dt\, PSF_{Ref}(\overline{\theta} - \overline{J}(t)), \quad (9)$$

where $PSF_{AvgR,m}(\overline{\theta})$ is the time-averaged point spread function for the reference image over the exposure time for the reference image. The exposure time for the reference image is from $T_{m-1}^R$ to $T_m^R$, which may be substantially equal to the exposure time, $T_{n-1}^O$ to $T_n^O$, for the primary image. The time-averaged point spread function for the reference image is the reference point spread function formed in operation 602.

With reference now to FIG. 7, an illustration of a process for identifying a blur model using a plurality of reference images in the form of a flowchart is depicted in accordance with an illustrative embodiment. The process illustrated in FIG. 7 may be used to implement operation 504 in FIG. 5 when the sequence of reference images includes a plurality of reference images, such as plurality of reference images 202 in FIG. 2.

The process described in FIG. 7 may be used to implement operation 504 in FIG. 5 when the reference imaging system that generates the plurality of reference images is separate from the array of image sensors used to form the primary image. For example, this process may be used when the reference imaging system is a second array of image sensors in imaging system 104 in FIG. 1.

The process begins by identifying a path of movement for the artificial reference point object during the exposure time for the primary image using the plurality of reference images (operation 700). In this illustrative example, in operation 700, the path of movement may be identified using a location for the artificial reference point object in each reference image in the plurality of reference images. The path of movement identified in operation 700 may be used to identify a particular location of the reference source for a sequence of points in time spanning the exposure time for the primary image.

The process then integrates the instantaneous point spread function for the primary image along the path of movement identified over the exposure time for the primary image to form an average point spread function (operation 702), with the process terminating thereafter. In operation 702, the instantaneous point spread function for a point object in the primary image at the location indicated by the path of movement corresponding to each point in time during the exposure time for the primary image is averaged to form the average point spread function. This average point spread function may be used as the blur model for the primary image.

With reference now to FIG. 8, an illustration of a process for identifying a blur model using a plurality of reference images in the form of a flowchart is depicted in accordance with an illustrative embodiment. The process illustrated in FIG. 8 may be used to implement operation 504 in FIG. 5 when the sequence of reference images includes a plurality of reference images, such as plurality of reference images 202 in FIG. 2.

The process described in FIG. 8 may be used to implement operation 504 in FIG. 5 when the reference imaging system that generates the plurality of reference images is a portion of the array of image sensors in the imaging system used to form the primary image. For example, when array of image sensors 106 in FIG. 1 is an orthogonal transfer array, reference imaging system 135 may be a portion of the orthogonal transfer array designated for imaging the artificial reference point object.

The process begins by identifying the reference point spread function for each reference image in the plurality of reference images (operation 800). In this illustrative example, the reference point spread function for each reference image may be identified using equation (3), as described above, with respect to the exposure period for the reference image.

The process then averages the reference point spread function for each reference image in the plurality of reference images to form an average reference point spread function (operation 802), with the process terminating thereafter. This average reference point spread function may be used as the blur model for the primary image.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 9, an illustration of a data processing system is depicted in accordance with an illustrative embodiment. In this illustrative example, data processing system 900 may be used to implement one or more computers in computer system 118 in FIG. 1. In this illustrative example, data processing system 900 includes communications framework 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for the data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906 or a cache, such as found in an interface and memory controller hub that may be present in communications framework 902.

Thus, the different illustrative embodiments provide a method and apparatus for reducing blur in an image. In one illustrative embodiment, a method for reducing blur in an image generated by an imaging system is provided. A blur model for the image is identified with respect to an exposure time for the image using a sequence of reference images of an artificial reference point object generated during the exposure time for the image. A source of the artificial reference point object is inertially stabilized over the exposure time. The image is deconvolved with the blur model identified for the image to form a modified image having a desired reduction in blur relative to the image generated by the imaging system.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing blur in an image generated by an imaging system comprising an optical system, an inertially stabilized source, and an array of image sensors, the method comprising:

focusing, using the optical system, light emanating from a scene onto the array of image sensors;

detecting, using the array of image sensors, the light to form the image;

generating an artificial reference point using the inertially stabilized source;

directing the artificial reference point towards the optical system such that the array of image sensors also detects the artificial reference point and not a reflection of the artificial reference point from the scene;

identifying a blur model for the image with respect to an exposure time for the image using a sequence of reference images of the artificial reference point object generated during the exposure time; and deconvolving the image with the blur model to form a modified image having a reduction in blur relative to the image.

2. The method of claim 1 further comprising:

generating the sequence of reference images using a reference imaging system, wherein a relative movement between the reference imaging system and the imaging system is less than a relative movement between the imaging system and the scene.

3. The method of claim 2, wherein the step of generating the sequence of reference images using the reference imaging system comprises:

generating the sequence of reference images using the reference imaging system, wherein the imaging system comprises the array of image sensors and wherein the reference imaging system is formed by a portion of the array of image sensors.

4. The method of claim 2, wherein the step of generating the sequence of reference images using the reference imaging system comprises:

generating the sequence of reference images using the reference imaging system, wherein the reference imaging system is a separate imaging system associated with the imaging system in which the relative movement between the reference imaging system and the imaging system is less than a relative movement between the imaging system and the scene.

5. The method of claim 1 further comprising:
inertially stabilizing the source of the artificial reference point object over the exposure time for the image using an inertial system, wherein the source is a laser device configured to generate the artificial reference point object in the form of a laser beam.

6. The method of claim 1, wherein the step of generating the artificial reference point object using the source comprises:
directing a laser beam towards an optical system in the imaging system using a laser device inertially stabilized over the exposure time for the image generated by the imaging system.

7. The method of claim 1, wherein the step of identifying the blur model comprises:
identifying a reference point spread function for a reference image in the sequence of reference images, wherein the reference point spread function is used as the blur model for the image.

8. The method of claim 1, wherein the step of identifying the blur model comprises:
identifying a path of movement for the artificial reference point object during the exposure time for the image using a plurality of reference images in the sequence of reference images; and
identifying an average point spread function for the image using the path of movement.

9. The method of claim 1, wherein the step of identifying the blur model comprises:
identifying an average reference point spread function using a plurality of reference images in the sequence of reference images, wherein the average reference point spread function is used as the blur model for the image.

10. An apparatus comprising:
an imaging system configured to generate an image over an exposure time, wherein the imaging system comprises:
an inertially stabilized source configured to generate an artificial reference point object during the exposure time;
an optical system configured to receive both the artificial reference point object from the inertially stabilized source without reflecting the artificial reference point from the scene, and also light from a scene;
an array of image sensors configured to generate the image using the light from the scene, and further configured to receive the artificial reference point;
an image processing system in communication with the imaging system and configured to identify a blur model for the image with respect to the exposure time using a sequence of reference images of the artificial reference point object and further configured to deconvolve the image with the blur model to form a modified image having a reduced blur relative to the image generated by the imaging system.

11. The apparatus of claim 10 further comprising:
an inertial system associated with the source, wherein the inertial system is configured to inertially stabilize the source over the exposure time for the image.

12. The apparatus of claim 11, wherein the inertial system is selected from one of an inertial reference unit and a passive isolation system.

13. The apparatus of claim 10 further comprising:
a reference imaging system.

14. The apparatus of claim 13, wherein the reference imaging system is a portion of the array of image sensors.

15. The apparatus of claim 13, wherein the reference imaging system is a separate imaging system associated with the imaging system in which relative movement between the reference imaging system and the imaging system is less than a relative movement between the imaging system and the scene.

16. The apparatus of claim 10, wherein the image processing system comprises:
a model generator configured to identify the blur model for the image with respect to the exposure time for the image using the sequence of reference images of the artificial reference point object; and
a deconvolver configured to deconvolve the image with the blur model to form the modified image using a deconvolution algorithm.

17. The apparatus of claim 16, wherein the model generator is configured to identify a reference point spread function for a reference image in the sequence of reference images and use the reference point spread function as the blur model for the image.

18. The apparatus of claim 16, wherein the model generator is configured to identify a path of movement for the artificial reference point object during the exposure time for the image using a plurality of reference images in the sequence of reference images, identify an average point spread function for the image using the path of movement, and use the average point spread function for the image as the blur model for the image.

19. The apparatus of claim 16, wherein the model generator is configured to identify an average reference point spread function using a plurality of reference images in the sequence of reference images and use the average reference point spread function as the blur model for the image.

20. The apparatus of claim 10, wherein the artificial reference point object appears to be present in a scene captured by the imaging system from a perspective of the imaging system.

21. The apparatus of claim 10, wherein the array of image sensors is an orthogonal transfer array.

22. The method of claim 1, wherein a relative movement between the optical system and the array of image sensors is less than a relative movement between the imaging system and the scene.

23. The apparatus of claim 10, wherein a relative movement between the optical system and the array of image sensors is less than a relative movement between the imaging system and the scene.

24. The apparatus of claim 10, wherein the inertially stabilized source comprises an inertially stabilized laser.

* * * * *